(12) United States Patent
Kwak et al.

(10) Patent No.: US 9,513,151 B2
(45) Date of Patent: Dec. 6, 2016

(54) FUEL WASTE VARIABLE IDENTIFICATION AND ANALYSIS SYSTEM

(71) Applicant: TrueLite Trace, Inc., Sunnyvale, CA (US)

(72) Inventors: Sung Bok Kwak, Cupertino, CA (US); Youri Bae, Sunnyvale, CA (US)

(73) Assignee: TrueLite Trace, Inc., Milpitas, CA (US)

( * ) Notice: Subject to any disclaimer, the term of this patent is extended or adjusted under 35 U.S.C. 154(b) by 0 days.

(21) Appl. No.: 14/634,533

(22) Filed: Feb. 27, 2015

(65) Prior Publication Data

US 2016/0252381 A1    Sep. 1, 2016

(51) Int. Cl.
*G01F 9/00* (2006.01)
*G07B 15/00* (2011.01)
*G07C 5/08* (2006.01)

(52) U.S. Cl.
CPC .............. *G01F 9/00* (2013.01); *G07C 5/085* (2013.01); *G07C 5/0808* (2013.01); *G07C 5/0825* (2013.01)

(58) Field of Classification Search
CPC .............. G01F 9/00; G01F 9/006; F16J 9/20; B63H 21/12; F02M 31/042; B62D 5/32; F16C 7/023; B60W 30/14; B60W 40/09; F02D 19/0628; F02B 51/04; B01J 23/8933; G07B 15/00; F04D 29/2222
USPC .... 701/21, 51, 103, 123; 235/61 J; 277/452; 123/556, 536; 180/406; 184/6.5; 340/435; 502/303; 705/13; 415/1
See application file for complete search history.

(56) References Cited

U.S. PATENT DOCUMENTS

| | | | | |
|---|---|---|---|---|
| 2,916,204 A | * | 12/1959 | Mennesson | G01F 9/006 235/104 |
| 3,785,459 A | * | 1/1974 | Patchen | F16C 7/023 184/6.5 |
| 3,958,657 A | * | 5/1976 | McBurnett | B62D 5/32 180/406 |
| 4,126,580 A | * | 11/1978 | Lauder | B01J 23/8933 423/213.2 |
| 4,138,125 A | * | 2/1979 | Lucas | F16J 9/20 277/452 |
| 6,029,636 A | * | 2/2000 | Kiel | F02M 31/042 123/556 |
| 6,685,424 B1 | * | 2/2004 | Ingalls | F04D 29/2222 415/1 |

(Continued)

*Primary Examiner* — Yuri Kan
(74) *Attorney, Agent, or Firm* — Invent Capture, LLC.; Samuel S. Cho

(57) ABSTRACT

A novel fuel waste variable identification and analysis system is capable of analyzing real-time on-board diagnostics (OBD) information of a vehicle from a remote monitoring station unit. This novel system analyzes, quantifies, and/or predicts various fuel waste variables for a particular vehicle and its driver. Preferably, various fuel waste variables are normalized with a novel metric called "RPG," or "engine rotation per minute per gallon of fuel." Utilizing the RPG as a normalizing factor for fuel waste variable measurements uniquely enables a realistic representation of a driver's fuel wasting behaviors in context of the particular vehicle's inherent, native, and average fuel consumption characteristics. Furthermore, the RPG-normalized fuel waste variables can be quantified as gallons of "wasted fuel" in computer-generated driving pattern analysis reports from the fuel waste variable identification and analysis system to motivate the vehicle operators and the drivers for higher operational fuel efficiencies.

14 Claims, 11 Drawing Sheets

A User Interface Screenshot from a Fuel Waste Variable Identification and Analysis System

100

(56) References Cited

U.S. PATENT DOCUMENTS

| | | | | |
|---|---|---|---|---|
| 6,885,919 B1* | 4/2005 | Wyant | ............... | B63H 21/12 |
| | | | | 340/450.2 |
| 2009/0287391 A1* | 11/2009 | Duineveld | ......... | F02D 19/0628 |
| | | | | 701/103 |
| 2010/0258094 A1* | 10/2010 | Hull | ................. | F02B 51/04 |
| | | | | 123/536 |
| 2012/0143449 A1* | 6/2012 | Chauncey | ............ | B60W 40/09 |
| | | | | 701/51 |
| 2014/0176321 A1* | 6/2014 | Chen | ................. | B60W 30/14 |
| | | | | 340/435 |
| 2014/0278837 A1* | 9/2014 | Blumer | ............ | G07B 15/00 |
| | | | | 705/13 |

\* cited by examiner

A User Interface Screenshot from a Fuel Waste Variable Identification and Analysis System

100

Engine Rotation-Per-Minute Per Gallon of Gas (RPG) Determination for Vehicle A
From a Fuel Waste Variable Identification and Analysis System

200

Engine Rotation-Per-Minute Per Gallon of Gas (RPG) Determination for Vehicle B
From a Fuel Waste Variable Identification and Analysis System

300

"Limousine A": Fuel Waste Variable Analysis Example

Vehicle: 2011-Lincoln-MKS

Date: 9/29/14 ~ 11/17/14

| Total Fuel consumed (Gal) | FWRPM (Gal) | FWSpeed (Gal) | FWHA (Gal) | FWHB (Gal) | FWIdling (Gal) | | % Waste |
|---|---|---|---|---|---|---|---|
| 347.7 | 0.64 | 13.7 | 0.35 | 1.1 | 27.9 | | 12.6% |
| | | | | | < 5 min | ≥ 5 min | |
| | | | | | 20.5 | 7.4 | |

Fuel Waste Variable Identification and Analysis Generated From a Fuel Waste Variable Identification and Analysis System for "Limousine A"

"SUV A": Fuel Waste Variable Analysis Example

Vehicle: 2005-Ford-E350

Date: 10/12/14 ~ 11/17/14

| Total Fuel consumed (Gal) | FWRPM (Gal) | FWSpeed (Gal) | FWHA (Gal) | FWHB (Gal) | FWIdling (Gal) | | % Waste |
|---|---|---|---|---|---|---|---|
| 86.3 | 0.0056 | 1.7 | 0.014 | 0.18 | 12 | | 16% |
| | | | | | < 5 min | ≥ 5 min | |
| | | | | | 5.4 | 6.6 | |

Fuel Waste Variable Identification and Analysis Generated From a Fuel Waste Variable Identification and Analysis System for "SUV A"

"SUV B": Fuel Waste Variable Analysis Example

Vehicle: 2012-Ford-E350

Date: 10/3/14 ~ 11/17/14

| Total Fuel consumed (Gal) | FWRPM (Gal) | FWSpeed (Gal) | FWHA (Gal) | FWHB (Gal) | FWIdling (Gal) | | % Waste |
|---|---|---|---|---|---|---|---|
| 227.1 | 0.376 | 6.72 | 0.01 | 0.96 | 16.6 | | 11% |
| | | | | | < 5 min | ≥ 5 min | |
| | | | | | 13.3 | 3.3 | |

Fuel Waste Variable Identification and Analysis Generated From a Fuel Waste Variable Identification and Analysis System for "SUV B"

"Small Truck A": Fuel Waste Variable Analysis Example

Vehicle: 2001 GMC W35042

Date: 10/9/14 ~ 11/17/14

| Total Fuel consumed (Gal) | FWRPM (Gal) | FWSpeed (Gal) | FWHA (Gal) | FWHB (Gal) | FWIdling (Gal) | | % Waste |
|---|---|---|---|---|---|---|---|
| 165.9 | 12.1 | 0.00006 | 0 | 0.51 | 9.11 | | 13% |
| | | | | | < 5 min | ≥ 5 min | |
| | | | | | 8.24 | 0.87 | |

Fuel Waste Variable Identification and Analysis Generated From a Fuel Waste Variable Identification and Analysis System for "Small Truck A"

"Big Truck A": Fuel Waste Variable Analysis Example

Vehicle: 2014-Scania-G440

Date: 10/2/14 ~ 11/17/14

| Total Fuel consumed (Gal) | FWRPM (Gal) | FWSpeed (Gal) | FWHA (Gal) | FWHB (Gal) | FWIdling (Gal) | | % Waste |
|---|---|---|---|---|---|---|---|
| 909.23 | 0 | 0 | 0 | 0 | 57 | | 6.3% |
| | | | | | < 5 min | ≥ 5 min | |
| | | | | | 29.7 | 27.2 | |

Fuel Waste Variable Identification and Analysis Generated From a Fuel Waste Variable Identification and Analysis System for "Big Truck A"

An Embodiment of a Fuel Waste Variable Identification and Analysis System with Real-Time Vehicle Monitoring

900

A System Block Diagram Example for a Vehicle-Side Fuel Waste Analytics Module

1000

| Mechanical and Physical Improvement Factors: |
|---|
| Tire Rolling Resistance, Aerodynamic Drag, Engine Tune-up, Fuel Injection System Cleaning, and etc. |

1101

| Non-Mechanical Improvement Factors: |
|---|
| A) Traffic and Environmental Condition<br>B) Driver Habits<br>    1) Fuel Wasted due to Over-Speeding: "FWSPEED"<br>    2) Fuel Wasted due to Over-RPM: "FWRPM"<br>    3) Fuel Wasted due to Hard Acceleration: "FWHA"<br>    4) Fuel Wasted due to Hard Braking: "FWHB"<br>    5) Fuel Wasted due to Engine Idling: "FWIdling" |

1102

Components of Fuel Efficiency Improvement Factors in a Vehicle

FIG. 11

$$RPG = \frac{\sum_i RPM_i \cdot \Delta t_i}{Fuel}$$

1200

RPG (Engine Rotation per Minute per Gallon of Fuel): A Novel Normalization and Comparison Factor for Determination of Fuel Waste in Various Fuel Waste Variables (i.e. FWSPEED, FWRPM, FWHA, FWHB, FWIdling)

FIG. 12 ially-higher fuel efficiencies in passenger vehicles, commercial trucks, and other fleet vehicles, many vehicle operational factors, such as drivers' driving habits, traffic conditions, and vehicle maintenance and aftermarket fuel efficiency optimizations, cause over thirty percent variability in fuel efficiency of commercial vehicle operations.

FUEL WASTE VARIABLE IDENTIFICATION AND ANALYSIS SYSTEM

BACKGROUND OF THE INVENTION

The present invention generally relates to vehicle fuel efficiency improvement and related vehicle information management methods and systems. The present invention also relates to real-time monitoring and data analysis of vehicle dynamics and fuel efficiency data from a remote location. More specifically, various embodiments of the present invention relate to a fuel waste variable and parameter identification and analysis system and a related method of operation.

A significant fuel cost increase in transport vehicles and a newfound socioeconomic interest in energy efficiency in the last several decades have placed fuel efficiency a top priority in passenger vehicles and commercial vehicle management industry. Even though newer engine designs and vehicle design improvements provide incrementally-higher fuel efficiencies in passenger vehicles, commercial trucks, and other fleet vehicles, many vehicle operational factors, such as drivers' driving habits, traffic conditions, and vehicle maintenance and aftermarket fuel efficiency optimizations, cause over thirty percent variability in fuel efficiency of commercial vehicle operations.

In context of business profitability for commercial vehicle operations, a commercial vehicle fleet operator of ten trucks, with each truck averaging 15 miles per gallon, can achieve over 19.5 miles per gallon (i.e. a thirty percent improvement), if some of the vehicle operational factors are optimized. Because a truck in a commercial vehicle fleet routinely incurs several thousand dollars per month in fuel costs, a thirty percent improvement in fuel efficiency results in hundreds of dollars in fuel savings per month, for one truck alone. For the commercial vehicle fleet operator of ten trucks, following the above example, the fuel cost savings can accumulate to thousands of dollars per month.

Despite significant cost saving potential from improved fuel efficiency by optimizing aftermarket vehicle parts and drivers' driving behaviors, conventional methods of fuel efficiency improvement methods in passenger cars, commercial trucking, and fleet vehicles have been unsystematic and disjointed at best. For example, in conventional attempts to improve fuel efficiency, a truck driver may be encouraged to accelerate or decelerate more gently by a commercial trucking company. The commercial trucking company may also issue guidelines to its employees to drive under a recommended speed limit for optimal fuel efficiency. Furthermore, another conventional method of attempting fuel savings is simply displaying an auto manufacturer-implemented fuel efficiency number on a vehicle's dashboard, which is typically expressed as miles per gallon (MPG) or kilometers per liter (km/l). Unfortunately, these conventional fuel efficiency improvement efforts tend to be overly incoherent and sporadic, thereby failing to be effective strategies in most vehicle fleet operations. Furthermore, in case of a company ownership of trucks and commercial vehicles, a driver of a commercial vehicle may not have sufficient incentive or motivation to attempt fuel saving optimizations during his or her vehicular journey in the first place, because the driver is not personally responsible for fuel costs.

Therefore, it may be desirable to devise a novel electronic system that enables a commercial vehicle operator to track, manage, and improve fuel efficiency of its fleet vehicles in operation with a centralized electronic infrastructure. Furthermore, it may also be desirable to devise a novel electronic system that identifies, calculates, and analyzes a driver's driving behavior to pinpoint problematic fuel waste variables that are particular to a driver and to a particular vehicle, in an effort to improve the fuel efficiency of the particular vehicle by optimizing driving events, habits, and behaviors.

Moreover, it may also be desirable to devise a driving pattern analysis display interface generated from a novel electronic system to motivate both vehicle operating entities and vehicle drivers to understand, predict, and improve vehicle fuel efficiencies through mechanical improvement factors as well as non-mechanical improvement factors.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a fuel waste variable identification and analysis system with a remote real-time vehicle on-board diagnostics monitoring is disclosed. This fuel waste variable identification and analysis system comprises: a vehicle on-board diagnostics unit connected to an engine control unit or a vehicular control chipset of a vehicle to record, diagnose, and generate engine, vehicle dynamics, and fuel consumption data as a real-time data stream; a fuel waste variable analytics module that receives the real-time data stream from the vehicle on-board diagnostics unit for detailed analysis and calculations of one or more fuel waste variables; a fuel waste variable identification and analytics unit in the fuel waste variable analytics module, wherein the fuel waste variable identification and analytics unit sets threshold values for the fuel waste variables, retrieves historical fuel consumption data from a vehicle-specific OBD data history database, and calculates pre-RPG (engine rotation per minute per gallon of fuel) normalized fuel waste variables, a vehicle-specific RPG value, RPG-normalized fuel waste variables, and a fuel waste percentage value for a selected period of time interval; the vehicle-specific OBD data history database that accumulates, stores, and categorizes vehicle dynamics and fuel consumption data downloaded from the vehicle; and a computer server or another electronic device with a CPU and a memory unit that executes the fuel waste variable identification and analytics unit and the vehicle-specific OBD data history database to calculate and display the RPG-normalized fuel waste variables on a display panel in the vehicle or in a remote monitoring station unit.

BRIEF DESCRIPTION OF DRAWINGS

FIG. 4 shows a fuel waste variable identification and analysis generated from a fuel waste variable identification and analysis system for "Limousine A," in accordance with an embodiment of the invention.

FIG. 5 shows a fuel waste variable identification and analysis generated from a fuel waste variable identification and analysis system for "SUV A," in accordance with an embodiment of the invention.

FIG. 6 shows a fuel waste variable identification and analysis generated from a fuel waste variable identification and analysis system for "SUV B," in accordance with an embodiment of the invention.

FIG. 7 shows a fuel waste variable identification and analysis generated from a fuel waste variable identification and analysis system for "Small Truck A," in accordance with an embodiment of the invention.

FIG. 8 shows a fuel waste variable identification and analysis generated from a fuel waste variable identification and analysis system for "Big Truck A," in accordance with an embodiment of the invention.

FIG. 11 shows components of fuel efficiency improvement factors in a vehicle, in accordance with an embodiment of the invention.

FIG. 12 shows an equation for calculating "RPG," or engine rotation per minute per gallon of fuel, which is a fuel waste variable-normalizing metric, in accordance with an embodiment of the invention.

DETAILED DESCRIPTION

Figure 1:
FIG. 1 shows a user interface screenshot from a fuel waste variable identification and analysis system, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more fuel waste variable identification and analysis systems, or methods of operating such novel systems. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "onboard vehicle monitoring device" is defined as an electronic device installed in a vehicle to collect and/or analyze a variety of vehicle-related data. In one example, a vehicle's onboard computer outputs many data parameters in real-time, such as vehicle diagnostic information (e.g. engine temperature, oil level, OBD codes, and etc.), speed information, engine rotation-per-minute (RPM) information, fuel levels, and miles driven relative to time. These data parameters can be part of the vehicle-related data collected and analyzed by a vehicle-side fuel waste variable analytics module and/or a server-side fuel waste variable analytics module.

In addition, for the purpose of describing the invention, a term "mileage" is defined as fuel efficiency of a vehicle.

Moreover, for the purpose of describing the invention, a term "empirical mileage" is defined as a real-life operation fuel efficiency by a driver in street road conditions, as opposed to a mere theoretical fuel efficiency or a government agency-tested fuel efficiency number.

Furthermore, for the purpose of describing the invention, a term "RPG," or "engine rotation per minute per gallon of fuel," is a measurement of a vehicle engine's rotation per minute (RPM) in a course of a trip divided by the amount of fuel used for the trip. RPG measures what a vehicle's characteristic RPM is per gallon of fuel, and is generally consistent for all trips of a particular vehicle. Therefore, utilizing this novel metric called "RPG," as a normalizing factor for fuel waste variable measurements, enables a realistic representation of a driver's fuel wasting behaviors in context of the particular vehicle's inherent and native average fuel consumption characteristics.

Furthermore, for the purpose of describing the invention, a term "fuel waste variable analytics module" is defined as an electronic sub-system, which at least comprises a fuel waste variable identification and analytics unit, a data communication unit, a memory unit, and a central processing unit (CPU). In a preferred embodiment of the invention, this electronic subs-system is part of a fuel waste variable identification and analysis system with a remote real-time vehicle OBD monitoring. The fuel waste variable identification and analysis system further comprises a vehicle on-board diagnostics (OBD) unit, a wireless communication network, a computer server, a vehicle fuel consumption database, and a computerized user interface to enable a remote real-time vehicle OBD monitoring. Furthermore, the fuel waste variable analytics module may be implemented inside a vehicle (i.e. vehicle-side fuel waste variable analytics module), inside a remote monitoring station unit connected to a computer server (i.e. server-side fuel waste variable analytics module), or both.

In addition, for the purpose of describing the invention, a term "driver's user interface" is defined as a computerized user interface with a display, which is connected to a vehicle-side fuel waste variable analytics module. The computerized user interface may be configured to display the driver's fuel waste variables over a particular time period, a "driving score," or any other fuel efficiency-related information, such as driving score trends.

Moreover, for the purpose of describing the invention, a term "driving score" is defined as a numerical indicator of a driver's current fuel efficiency driving performance relative to an empirically-best fuel efficiency driving performance achieved previously by the driver or by a peer driver in a same commercial vehicle fleet organization. In a preferred embodiment of the invention, the driving score is calculated by a current mileage (i.e. fuel efficiency) by a particular vehicle divided by the best empirical mileage achieved by the same type and model of the particular vehicle in a commercial fleet, which is then multiplied by 100. A higher driving score generally indicates more fuel efficient driving than a lower driving score. Preferably, the best empirical mileage achieved by the same type and model of the particular vehicle in the commercial fleet is specific to an identical route and a similar traffic condition experienced by the particular vehicle, so that the driving score is a fair and accurate numerical indicator of the driver's current fuel efficiency driving performance, compared to the best of the peer drivers who have driven the same route under the similar traffic condition.

Furthermore, for the purpose of describing the invention, a term "remote monitoring station unit" is defined as a vehicle fleet monitoring location for one or more commercial vehicles in operation. Examples of remote monitoring station units include, but are not limited to, a commercial vehicle operation control center, a vehicle monitoring service center, and a fleet vehicle employer's information technology (IT) control center.

In addition, for the purpose of describing the invention, a term "computer server" is defined as a physical computer system, another hardware device, a software module executed in an electronic device, or a combination thereof. For example, in context of an embodiment of the invention, a "computer server" is dedicated to executing one or more computer programs for receiving, processing, and analyzing fuel consumption-related OBD input data, and generating, calculating, and displaying fuel savings scores and fuel waste variable analysis and information output. Furthermore, in one embodiment of the invention, a computer server is connected to one or more data networks, such as a local area network (LAN), a wide area network (WAN), a cellular network, and the Internet. Moreover, a computer server can be used by a vehicle monitoring personnel for gathering and analyzing fuel waste variable and fuel consumption-related OBD input data and also for generating and calculating fuel savings scores and fuel waste variable analysis and information output.

One aspect of an embodiment of the present invention is providing a novel electronic system that enables a commercial vehicle operator to track, manage, and improve fuel efficiency of its fleet vehicles in operation with a centralized electronic infrastructure.

Another aspect of an embodiment of the invention is providing a novel electronic system that identifies, calculates, and analyzes a driver's driving behavior to pinpoint problematic fuel waste variables that are particular to a driver and to a particular vehicle, in an effort to improve the fuel efficiency of the particular vehicle by optimizing driving events, habits, and behaviors.

Yet another aspect of an embodiment of the invention is providing a driving pattern analysis display interface generated from a novel electronic system to motivate both vehicle operating entities and vehicle drivers to understand, predict, and improve vehicle fuel efficiencies through mechanical improvement factors as well as non-mechanical improvement factors.

Yet another aspect of an embodiment of the present invention is providing a novel electronic system that enables each vehicle driver to understand a vehicle's current fuel efficiency relative to peer vehicles, and improve the fuel efficiency of vehicles by optimizing driving events, habits, and behaviors.

Yet another aspect of an embodiment of the present invention is providing a fuel savings scoring system and a novel metric called the "driving score" for measuring a driver's fuel efficiency driving performance relative to the best of the driver's own past records and driver's peer records under a similar route and a similar traffic condition.

Yet another aspect of an embodiment of the present invention is providing a novel graphical representation of the fuel waste variables and the fuel savings progress to motivate both commercial vehicle operating entities and commercial vehicle drivers to improve fleet vehicle fuel efficiencies through mechanical improvement factors as well as non-mechanical improvement factors.

FIG. 1 shows a user interface screenshot (100) from a fuel waste variable identification and analysis system, in accordance with an embodiment of the invention. This user interface screenshot (100) shows a monthly report (e.g. for the month of October) of a driver's driving patterns in a particular vehicle. In this embodiment of the invention, the user interface screenshot (100) is generated from a fuel waste variable identification and analysis system after receiving and analyzing remotely-transmitted and vehicle-specific OBD data in context of a vehicle fuel consumption database (e.g. 917 of FIG. 1) that stores historical OBD data and fuel waste variables for specific vehicles.

As shown in FIG. 1, the user interface screenshot (100) shows a driving score of 83% for a particular vehicle, which places the driver in the "improvement" category based on the scale of the driving score. In a preferred embodiment, the driving score is calculated by a current mileage (i.e. fuel efficiency) of a particular vehicle over a selected time period (i.e. the month of October) multiplied by 100 and divided by the best empirical mileage (e.g. the peak mileage) achieved by the same type and model of the particular vehicle in a commercial fleet. A higher driving score generally indicates more fuel efficient driving than a lower driving score. As shown in the user interface screenshot (100), the driving score may be categorized as "excellent" for 90 percent~100 percent range, "good" for 85 percent~90 percent range, "improvement needed" for 80 percent~85 percent range, and "poor" for scores below 80 percent.

Preferably, the best empirical mileage achieved by the same type and model of the particular vehicle, which is utilized in the driving score calculation, is specific to an identical route and a similar traffic condition experienced by the particular vehicle, so that the driving score is a fair and accurate numerical indicator of the driver's current fuel efficiency driving performance, compared to the best of the peer drivers who have driven the same route under the similar traffic condition.

The user interface screenshot (100) also displays "Fuel Wasting Factors" for the driving pattern analysis result. In the preferred embodiment of the invention, the "Fuel Wasting Factors" displayed in the user interface are calculated and derived from various fuel waste variables, which are identified and analyzed by the fuel waste variable identification and analysis system. As shown in the user interface screenshot (100), excessive engine idling, RPM's, speeding, hard braking, and hard acceleration are identified as four fuel waste variables, and each fuel waste variable has its own "fuel waste" threshold value that triggers alerts for exceeding each of the fuel waste threshold value. For example, as shown in the "Alerts" column in the user interface screenshot (100), sixty one alerts were generated for idling the engine over five minutes, wherein the five minutes is the specific fuel waste threshold value for the engine idling fuel waste variable. Similarly, twenty nine alerts were generated for over-revving the engine over 3500 RPM, wherein the specific fuel waste threshold value for the engine RPM is set at 3500 RPM. Likewise, seventy two alerts were generated for over-speeding the vehicle, with the specific fuel waste threshold value for over-speeding set at 80 miles per hour (MPH).

Furthermore, as shown in the user interface screenshot (100) in FIG. 1, specific amounts of wasted fuel in each fuel waste variable is calculated, derived, and displayed relative to the total fuel usage for the vehicle. In case of engine idling as a fuel waste variable, the user interface indicates that 20.3 gallons of fuel are wasted for idling over 5 minutes in the month of October. In case of over-revving as a fuel waste variable, the user interface indicates that 0.4 gallons are wasted in excessive over-revving of the engine over the fuel waste threshold value of 3500 RPM. In case of over-speeding as a fuel waste variable, the user interface indicates that 41 gallons of fuel are wasted, with the fuel waste threshold value of 80 MPH. For remaining fuel waste variables in this user interface screenshot (100), hard braking and hard acceleration wasted 0.6 gallons and 0.2 gallons of fuel, respectively. The user interface can color-code or highlight the most significant fuel waste variables for the monthly driving pattern analysis report. Because engine idling and over-speeding contributed the most to wasted fuel amounts, these two fuel usage categories are highlighted for the driver's and the vehicle operator's attention. The user interface also indicates a total amount of "wasted" fuel (e.g. 62.5 gallons or 26.5 percent of total fuel purchased in the month of October) that are defined by exceeding a variety of fuel waste threshold values during the operation of the vehicle.

Figure 2:
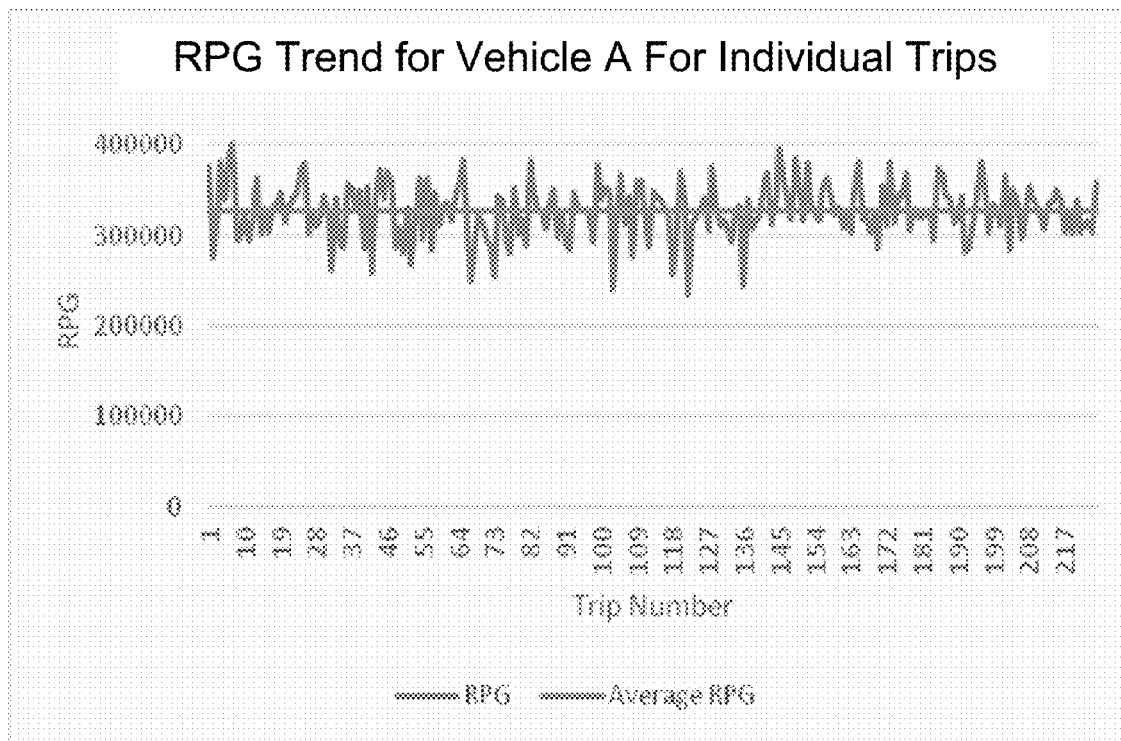
FIG. 2 shows an engine rotation-per-minute per gallon of gas (RPG) determination for "Vehicle A" from a fuel waste variable identification and analysis system, in accordance with an embodiment of the invention.
Figure 3:
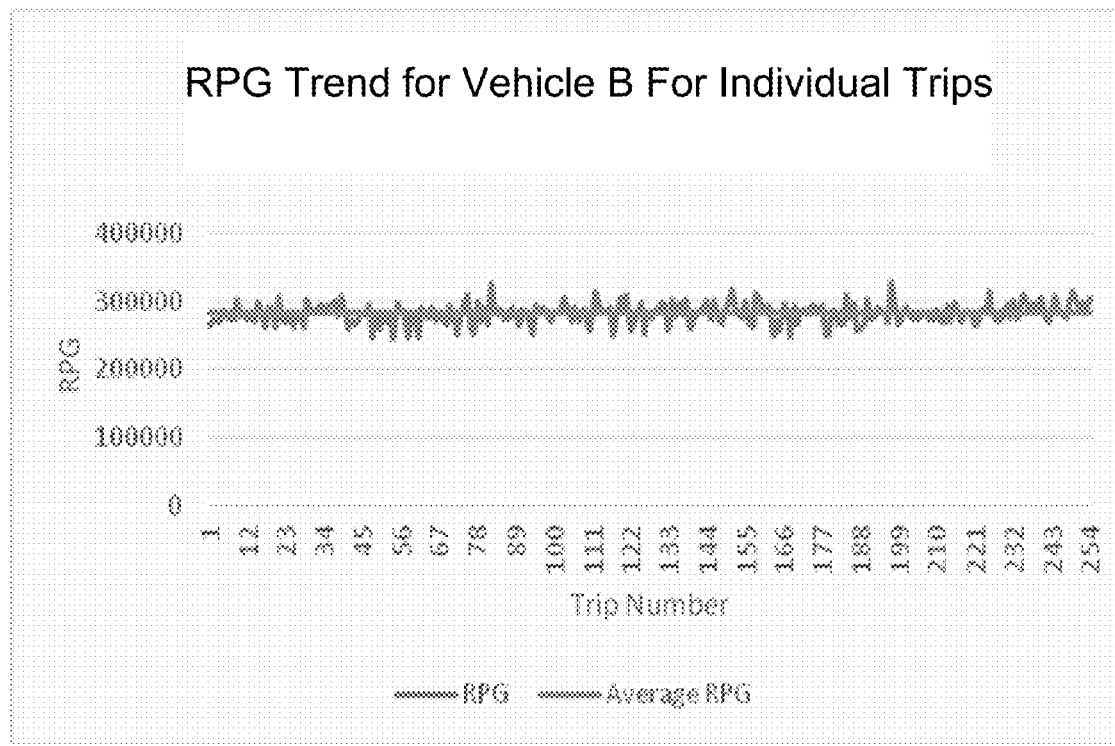
FIG. 3 shows an engine rotation-per-minute per gallon of gas (RPG) determination for "Vehicle B" from a fuel waste variable identification and analysis system, in accordance with an embodiment of the invention.

In a preferred embodiment of the invention, the wasted fuel calculations involve normalization of fuel waste variables with a novel metric called "RPG," or "engine rotation per minute per gallon of fuel." RPG is a measurement of a vehicle engine's rotation per minute (RPM) in a course of a trip divided by the amount of fuel used for the trip. RPG measures a vehicle engine's characteristic and typical RPM per gallon of fuel in one or more trips, and this metric is generally consistent (i.e. as shown in FIGS. 2 and 3) in all trips for a particular vehicle. Therefore, utilizing RPG as a normalizing factor for fuel waste variable measurements enables a realistic representation of a driver's fuel wasting behaviors in context of the particular vehicle's inherent, native, and average fuel consumption characteristics.

Continuing with FIG. 1, in one embodiment of the invention, the user interface screenshot (100) may also show worst traffic routes with satellite view, fuel record card for inputting the driver's fuel purchases into the fuel waste variable identification and analysis system, and graphic icon legends for fuel waste variables. The driving pattern analysis result, which is generated on a display screen connected to the fuel waste variable identification and analysis system, may be a monthly report, as shown in FIG. 1, or a daily, weekly, quarterly, or yearly report, depending on the preference of the vehicle operator and the driver.

FIG. 2 shows an engine rotation-per-minute per gallon of gas (RPG) determination for "Vehicle A" from a fuel waste variable identification and analysis system, in accordance with an embodiment of the invention. The RPG trends for Vehicle A (200) is substantially consistent over various kinds of trips (i.e. over 217 trips in the graph shown in FIG. 2) for a particular vehicle, and this metric tends to reflect a particular vehicle's inherent, native, and average fuel consumption characteristics.

Similarly, FIG. 3 shows an engine rotation-per-minute per gallon of gas (RPG) determination for "Vehicle B" from a fuel waste variable identification and analysis system, in accordance with an embodiment of the invention. The RPG trends for Vehicle B (300) is also substantially consistent over various kinds of trips (i.e. over 254 trips in the graph shown in FIG. 3) for a particular vehicle, and this metric tends to reflect a particular vehicle's inherent and native fuel consumption characteristics. Therefore, the average RPG measures for Vehicle A and Vehicle B are substantially distinct (e.g. Vehicle A's average RPG is higher than Vehicle B's average RPG), as the average RPG for each vehicle reflect each vehicle's inherent and native fuel consumption characteristics.

For utilizing RPG as a normalizing factor for fuel waste variables, the following analysis is presented for application in various embodiments of the invention. An objective measure of the driving force of vehicle is the engine RPM. From analytical perspective, one of ordinary skill in the art can reasonably presume that a "fuel wasting event" is a consequence of any unnecessary use of engine RPM. When the vehicle is on the road and is operating, then the native characteristics of engine RPM for a typical trip may still vary significantly, depending on a particular driver's driving style and behavior.

Therefore, if the total RPM generated in each trip for a particular vehicle is normalized by the amount of fuel consumed in each corresponding trip, a novel metric called RPM per one Gallon of Fuel (RPG) can be deduced by the following mathematical reasoning:

If i is an index of each time, RPG can be defined as:

$$RPG = \frac{\Sigma_i RPM_i \cdot \Delta t_i}{\text{Fuel}}$$

Furthermore, for various embodiments of the invention, fuel wasting variables and their corresponding threshold values are selected for determination of excessive fuel waste by a driver of a particular vehicle over a selected period of time. Therefore, for each fuel waste variable, also called herein interchangeably as a "fuel wasting factor," an operator of the fuel waste variable identification and analysis system can define corresponding threshold values as shown in the following table, in one embodiment of the invention:

| Fuel Waste Variable | Notation in equations | Threshold Values |
| --- | --- | --- |
| Over-Speed | $V_{limit}$ | 100 Km/h = 62 MPH |
| Over-RPM | $RPM_{limit}$ | 2500 rpm |
| Hard Acceleration | | 1.5 m/s$^2$ = 0.18 g (g = 9.8 m/s$^2$) |
| Hard Brake | | −1.5 m/s$^2$ = 0.18 g (g = 9.8 m/s$^2$) |
| Idling | | 5 minutes |

Moreover, for various embodiments of the invention, it may be desirable to define each fuel waste variable mathematically. In one embodiment of the invention, for mathematically defining "over-speeding" as a fuel waste variable, WSpeed is the total amount of over-speeding above the recommended speed limit, with a threshold value set at 100 km/h, or 62 MPH:

$$\left( v_{limit} = 100 \ \frac{km}{h} \right).$$

$$WSpeed_i = \begin{cases} v_i - v_{limit}, & \text{if } v_i > v_{limit} \\ 0, & \text{if } v_i \leq v_{limit} \end{cases}$$

$$WSpeed = \sum_i WSpeed_i \cdot \Delta t_i,$$

where $\Delta t_i$ is the time-interval (preferably, 10 seconds).

Furthermore, in one embodiment of the invention, for mathematically defining "over-revving" as a fuel waste variable, WRPM is the total amount of RPM above the recommended RPM limit, with a threshold value set at 2500 RPM. ($RPM_{limit}=2500$ rpm).

$$WRPM_i = \begin{cases} RPM_i - RPM_{limit}, & \text{if } RPM_i > RPM_{limit} \\ 0, & \text{if } RPM_i \leq RPM_{limit} \end{cases}$$

$$WRPM = \sum_i WRPM_i \cdot \Delta t_i$$

Moreover, in one embodiment of the invention, WHA is the total amount of excessive or "wasteful" acceleration above the recommended acceleration limit, with a threshold value set at 0.18 g, where g is $$980 \ \frac{cm}{s^2}.$$

In one example, WHA can be mathematically defined as follows:

$$WHA_i = \begin{cases} HA_i - 0.18 \ g, & \text{if } HA_i \geq 0.18 \ g \\ 0, & \text{if } HA_i \leq 0.18 \ g \end{cases}, \text{ where } HA_i = \frac{v_{i+1} - v_i}{t_{i+1} - t_i}$$

$$WHA = \sum_i WHA_i \cdot \Delta t_i$$

Furthermore, in one embodiment of the invention, WHB is the total amount of excessive deceleration, or excessive and abrupt braking below the recommended deceleration limit, with a threshold value set at −0.18 g, where g is $$980 \ \frac{cm}{s^2}.$$

In one example, WHB can be mathematically defined as follows:

$$WHB_i = \begin{cases} -HB_i + 0.18 \ g, & \text{if } HB_i < -0.18 \ g \\ 0, & \text{if } HB_i \leq -0.18 \ g \end{cases}, \text{ where } HB_i = \frac{v_{i+1} - v_i}{t_{i+1} - t_i}$$

$$WHB = \sum_i WHB_i$$

Moreover, in one embodiment of the invention, WIdling is the total amount of excessive and wasteful engine idling time, with a threshold value set at a certain time limit, such as 5 minutes of continuous engine idling. In one example, WIdling can be mathematically defined as follows:

$$WIdling = \sum_i Idling_i \cdot \Delta t_i$$

As previously described for the definition of RPG and its role as a normalization factor for fuel waste variables, it may also be desirable to quantify "wasted fuel" due to the fuel waste variables, such as over-revving, over-speeding, hard acceleration, hard deceleration, and excessive engine idling.

Thus, for quantifying "over-revving" as wasted fuel, "fuel wasted for over-revving," or FWRPM, can be mathematically expressed as follows:

$$WRPM_i = \begin{cases} RPM_i - RPM_{limit}, & \text{if } RPM_i > RPM_{limit} \\ 0, & \text{if } RPM_i \leq RPM_{limit} \end{cases}$$

$$WRPM = \sum_i WRPM_i \cdot \Delta t_i$$

$$FWRPM = \frac{WRPM}{RPG}$$

FWRPM = Fuel Wasting Due to Over-Revving Above a Threshold Value (e.g. 2,500 RPM)

Furthermore, for quantifying "over-speeding" as wasted fuel, "fuel wasted for over-speeding," or FWSpeed, can also be mathematically expressed. Because RPM and speed are recorded in different scale of value, the scale of value for vehicular speed is converted to match RPM's scale of value, which corresponds the threshold value for over-speeding (e.g. 100 km/h or 62 MPH). In empirical observations, even though RPM generation patterns show high fluctuation at low speeds, RPM generation patterns become very similar to speed trends in the over-speeding region (e.g. 100 km/h or 62 MPH). Thus, a cut-off RPM value can be determined to generate a vehicular speed over 62 MPH by the following transformation:

Let r be a rescaling factor and IRPM be the idling RPM for a given car.

$$r = \text{mean}\left( \frac{RPM_i - m}{S_i} \right)$$

where $m=\text{mean}(IRPM_i)$ and i is an index where $S_i > v_{limit}$. Speed S is rescaled by r and shifted by IRPM as follows:

$$\tilde{S}_i = rS_i + m$$

Then, rescaled speed $\tilde{S}_i$ becomes comparable to a corresponding RPM value. In one embodiment, the recorded speed is measured in cm/s and IRPM in RPM. In context of cm/s as the recorded unit of speed, the threshold value for over-speeding at 100 km/h is equivalent to 2777 cm/s after conversion. Thus, the rescaled speed $\tilde{S}_{cut-off}=r \cdot 2777+m$ is the cutoff RPM value in this example. The wasted fuel due to over-speeding, or FWSpeed, can be mathematically expressed as follows:

$$WSpeed_i = \begin{cases} RPM_i - \tilde{S}_{cut-off}, & \text{if } RPM_i > \tilde{S}_{cut-off} \\ 0, & \text{if } RPM_i \leq \tilde{S}_{cut-off} \end{cases}$$

-continued $$WSpeed = \sum_i WSpeed_i \cdot \Delta t_i$$

$$FWSpeed = \frac{WSpeed}{RPG}$$

FWSpeed = Fuel Wasting due to Over-Speeding Above a Threshold Value

Moreover, for quantifying hard acceleration as wasted fuel, "fuel wasted due to excessive hard acceleration," or FWHA, can also be mathematically expressed. For the excessive hard acceleration case, a reasonable assumption can be made that a rapid rise in RPM corresponds to a subsequent hard acceleration. In an empirical observation of real-time vehicle data, an instance of RPM value at the moment of excessive hard acceleration is detected, along with another instance of RPM value at one prior time interval. In mathematical quantification, if i is an index at the instance of excessive hard acceleration, $$WHA_i = RPM_{i-1} + RPM_i$$

$$WHA = \sum_i WHA_i \cdot \Delta t_i$$

$$FWHA = \frac{WHA}{RPG}$$

FWHA = Fuel Wasting Due to Excessive Hard Acceleration Above a Threshold Value.

Furthermore, for quantifying hard deceleration as wasted fuel, "fuel wasted due to excessive hard braking," or FWHB, can also be mathematically expressed. For the excessive hard braking case, a reasonable assumption can be made that RPM at high speed is likely "wasted" by a subsequent hard deceleration or braking, as the vehicle is unable to capitalize on the fuel efficiency from the inertia of existing velocity of the vehicle. In an empirical observation of real-time vehicle data, RPM at the instance of excessive hard braking is detected and recorded. Furthermore, RPM at one later time interval after the instance of excessive hard braking is also detected and recorded. In mathematical quantification, if i is an index at the instance of excessive hard braking, $$WHB_i = RPM_i + RPM_{i+1}$$

$$WHB = \sum_i WHB_i \cdot \Delta t_i$$

$$FWHB = \frac{WHB}{RPG}$$

FWHB = Fuel Wasting Due to Hard Braking (Exceeding a Threshold Value)

Moreover, for quantifying excessive engine idling as wasted fuel, "fuel wasted due to idling" or FWIdling, can also be mathematically expressed. During a vehicle's typical operation, engine idling can be one of the biggest fuel wasting factor, especially for a heavy duty truck. Any engine RPM generated during idling is essentially wasting fuel. Thus, if i is an index at the instance of engine idling, a wasted fuel amount can be quantified mathematically with the following expressions:

$$WIdling = \sum_i WIdling_i \cdot \Delta t_i$$

$$FWIdling = \frac{WIdling}{RPG}$$

FWIdling = Fuel Wasting Due to Engine Idling

In various embodiments of the invention, fuel waste variables that are normalized by RPG and are measured in gallons of fuel are utilized to quantify wasted fuel in each category of fuel waste variables. In a preferred embodiment, there are five RPG-normalized fuel wasted variables, namely, FWRPM, FWSpeed, FWHA, FWHB, and FWIdling, all of which have been mathematically defined and expressed in the descriptions above. In another embodiment of the invention, other fuel waste variables may also be utilized for quantification and visualization of wasted fuel. Furthermore, an empirically-chosen threshold for each fuel waste variable can vary depending on a particular embodiment of the invention.

FIG. 4 shows a fuel waste variable identification and analysis (400) generated from a fuel waste variable identification and analysis system for "Limousine A," in accordance with an embodiment of the invention. As shown in this fuel waste variable identification and analysis (400), this particular vehicle (i.e. Limousine A) wasted 12.6 percent of total fuel consumption, which is calculated by adding each fuel waste category divided by the total fuel consumed, and multiplied by 100. In each category of fuel waste variable, Limousine A wasted 0.64 gallons of fuel in over-revving the engine (i.e. FWRPM), 13.7 gallons of fuel in over-speeding (i.e. FWSpeed), 0.35 gallons of fuel in excessive hard acceleration (i.e. FWHA), 1.1 gallons of fuel in excessive hard braking (i.e. FWHB), and 27.9 gallons of fuel in engine idling (i.e. FWIdling). In this particular embodiment, the engine idling fuel waste variable is further sub-categorized into under five minutes and equal to or greater than five minutes.

For one of ordinary skill in the art, it can be understood from this fuel waste variable identification and analysis (400) that the significant fuel waste variables were over-speeding (i.e. 13.7 gallons of wasted fuel) and engine idling (i.e. 27.9 gallons of wasted fuel). It can also be deduced further that over-speeding may be a more significant fuel wasting variable with improvement potential for this particular vehicle and its driver, because the bulk of fuel waste for engine idling came below five minutes (i.e. 20.5 gallons of wasted fuel v. 7.4 gallons of wasted fuel), and it may be impractical to turn off the engine manually to prevent engine idling for short periods of time during an operation of a vehicle.

FIG. 5 shows a fuel waste variable identification and analysis generated from a fuel waste variable identification and analysis system for "SUV A," in accordance with an embodiment of the invention. As shown in this fuel waste variable identification and analysis (500), this particular vehicle (i.e. SUV A) wasted 16 percent of total fuel consumption, which is calculated by adding each fuel waste category divided by the total fuel consumed, and multiplied by 100. In each category of fuel waste variable, SUV A wasted 0.0056 gallons of fuel in over-revving the engine (i.e. FWRPM), 1.7 gallons of fuel in over-speeding (i.e. FWSpeed), 0.014 gallons of fuel in excessive hard acceleration (i.e. FWHA), 0.18 gallons of fuel in excessive hard braking (i.e. FWHB), and 12 gallons of fuel in engine idling (i.e. FWIdling). In this particular embodiment, the engine idling fuel waste variable is further sub-categorized into under five minutes and equal to or greater than five minutes.

For one of ordinary skill in the art, it can be understood from this fuel waste variable identification and analysis (500) that the significant fuel waste variables were engine idling (i.e. 12 gallons of wasted fuel). In this particular vehicle and its driver's driving behaviors, it can also be deduced further that engine over-idling may be an addressable problem with improvement potential, because a majority of fuel waste for engine idling came above five minutes (i.e. 6.6 gallons of wasted fuel v. 5.4 gallons of wasted fuel). As a potential solution for reduction of unnecessary fuel waste, the driver can be trained to turn the engine off for any engine idling above a set period of time (e.g. five minutes). Furthermore, an aftermarket automatic engine shutoff/start unit can be installed in SUV A to turn off the engine automatically, when the vehicle is idling for more than the set period of time.

FIG. 6 shows a fuel waste variable identification and analysis (600) generated from a fuel waste variable identification and analysis system for "SUV B," in accordance with an embodiment of the invention. As shown in this fuel waste variable identification and analysis (600), this particular vehicle (i.e. SUV B) wasted 11 percent of total fuel consumption, which is calculated by adding each fuel waste category divided by the total fuel consumed, and multiplied by 100. In each category of fuel waste variable, SUV B wasted 0.376 gallons of fuel in over-revving the engine (i.e. FWRPM), 6.72 gallons of fuel in over-speeding (i.e. FWSpeed), 0.01 gallons of fuel in excessive hard acceleration (i.e. FWHA), 0.96 gallons of fuel in excessive hard braking (i.e. FWHB), and 16.6 gallons of fuel in engine idling (i.e. FWIdling). In this particular embodiment, the engine idling fuel waste variable is further sub-categorized into under five minutes and equal to or greater than five minutes.

For one of ordinary skill in the art, it can be understood from this fuel waste variable identification and analysis (600) that the significant fuel waste variables were over-speeding (i.e. 6.72 gallons of wasted fuel) and engine idling (i.e. 16.6 gallons of wasted fuel). It can also be deduced further that over-speeding may be a more significant fuel wasting variable with improvement potential for this particular vehicle and its driver, because the bulk of fuel waste for engine idling came below five minutes (i.e. 13.3 gallons of wasted fuel v. 3.3 gallons of wasted fuel), and it may be impractical to turn off the engine manually to prevent engine idling for short periods of time during an operation of a vehicle. However, if the vehicle operator is sufficiently motivated to improve fuel efficiency further, and is willing to invest in an aftermarket fuel-saving device, an aftermarket automatic engine shutoff/start unit may be installed in SUV B to turn off the engine automatically, when the vehicle is idling for more than the set period of time.

FIG. 7 shows a fuel waste variable identification and analysis (700) generated from a fuel waste variable identification and analysis system for "Small Truck A," in accordance with an embodiment of the invention. As shown in this fuel waste variable identification and analysis (700), this particular vehicle (i.e. Small Truck A) wasted 13 percent of total fuel consumption, which is calculated by adding each fuel waste category divided by the total fuel consumed, and multiplied by 100. In each category of fuel waste variable, Small Truck A wasted 12.1 gallons of fuel in over-revving the engine (i.e. FWRPM), 0.00006 gallons of fuel in over-speeding (i.e. FWSpeed), zero gallons of fuel in excessive hard acceleration (i.e. FWHA), 0.51 gallons of fuel in excessive hard braking (i.e. FWHB), and 9.11 gallons of fuel in engine idling (i.e. FWIdling). In this particular embodiment, the engine idling fuel waste variable is further sub-categorized into under five minutes and equal to or greater than five minutes.

For one of ordinary skill in the art, it can be understood from this fuel waste variable identification and analysis (700) that the significant fuel waste variables were over-revving of the engine (i.e. 12.1 gallons of wasted fuel) and engine idling (i.e. 9.11 gallons of wasted fuel). It can also be deduced further that over-revving (i.e. FWRPM) may be a more significant fuel wasting variable with improvement potential for this particular vehicle and its driver, because training the driver to ease off on the accelerator pedal may be easier to accomplish than turning off the engine to prevent idling for a short period of time. As shown in FWIdling category, the driver for Small Truck A only recorded 0.87 gallons of fuel waste for engine idling over 5 minutes, while recording 8.24 gallons of fuel waste for engine idling under 5 minutes. In real-life operation of the vehicle with stop-and-go traffic, it may be impractical to turn off the engine manually to prevent engine idling for short periods of time. However, if the vehicle operator is sufficiently motivated to improve fuel efficiency further, and is willing to invest in an aftermarket fuel-saving device, an aftermarket automatic engine shutoff/start unit may be installed in Small Truck A to turn off the engine automatically, when the vehicle is idling for more than the set period of time.

FIG. 8 shows a fuel waste variable identification and analysis (800) generated from a fuel waste variable identification and analysis system for "Big Truck A," in accordance with an embodiment of the invention. As shown in this fuel waste variable identification and analysis (800), this particular vehicle (i.e. Big Truck A) wasted 6.3 percent of total fuel consumption, which is calculated by adding each fuel waste category divided by the total fuel consumed, and multiplied by 100. In each category of fuel waste variable, Big Truck A wasted zero gallons of fuel in over-revving the engine (i.e. FWRPM), zero gallons of fuel in over-speeding (i.e. FWSpeed), zero gallons of fuel in excessive hard acceleration (i.e. FWHA), zero gallons of fuel in excessive hard braking (i.e. FWHB), and 57 gallons of fuel in engine idling (i.e. FWIdling). In this particular embodiment, the engine idling fuel waste variable is further sub-categorized into under five minutes and equal to or greater than five minutes.

For one of ordinary skill in the art, it can be understood from this fuel waste variable identification and analysis (800) that the only fuel waste variable that can be improved upon is in the engine idling category (i.e. FWIdling). Because 27.2 gallons of fuel are wasted for engine idling over five minutes, a significant fuel efficiency improvement potential exists with the driver training for shutting off the engine during long idling periods. Furthermore, an aftermarket automatic engine shutoff/start unit can be installed in Big Truck A to turn off the engine automatically, when the vehicle is idling for more than the set period of time.

Figure 9:
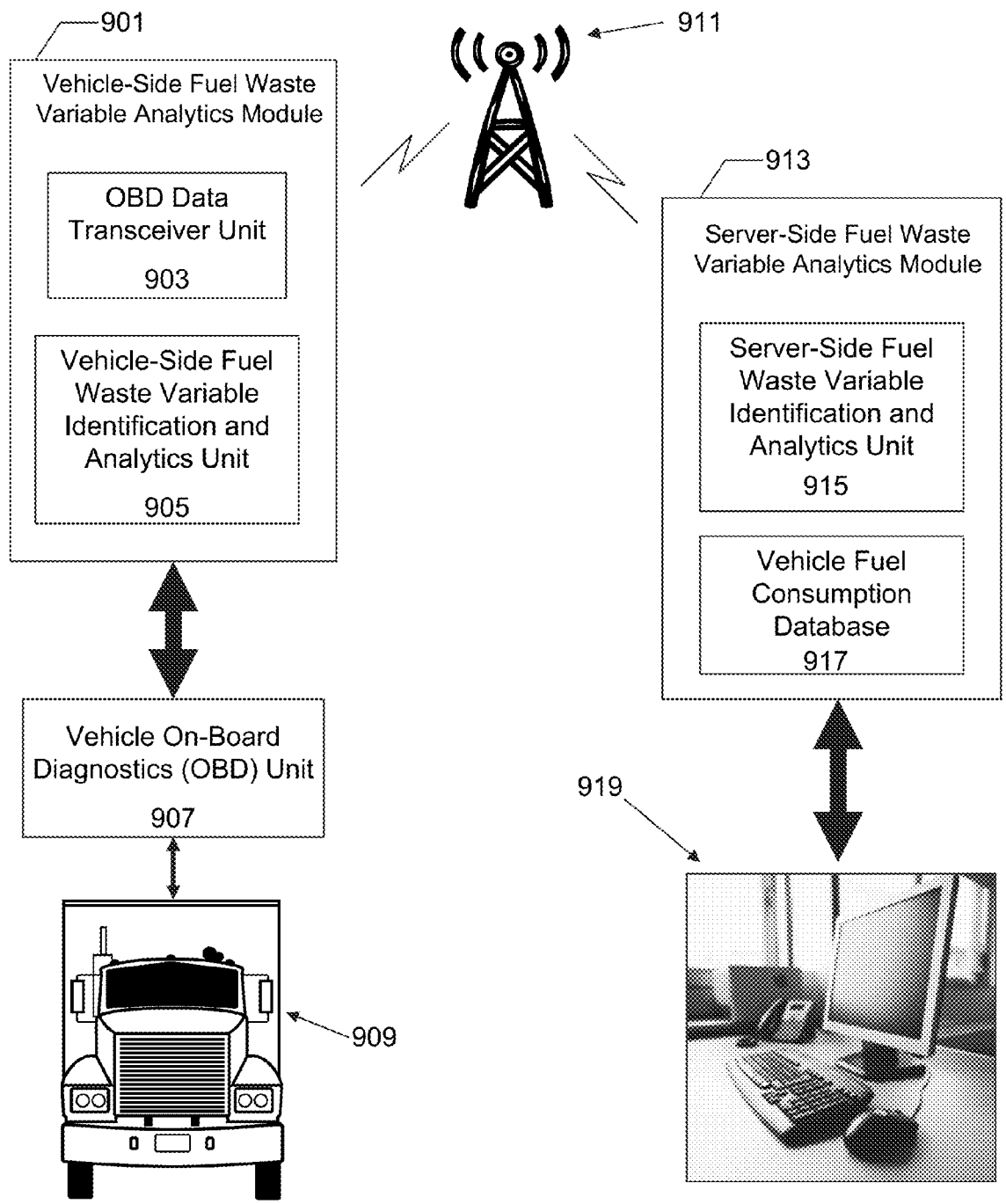
FIG. 9 shows an embodiment of a fuel waste variable identification and analysis system with real-time vehicle monitoring, in accordance with an embodiment of the invention.

FIG. 9 shows an embodiment of a fuel waste variable identification and analysis system (900) with real-time vehicle monitoring, in accordance with an embodiment of the invention. In this embodiment of the invention, the fuel waste variable identification and analysis system (900) comprises a vehicle-side fuel waste variable analytics module (901), a vehicle on-board diagnostics (OBD) unit (907), a data communication network (911), a server-side fuel waste variable analytics module (913), and a remote monitoring station unit (919).

In this embodiment of the invention, the vehicle-side fuel waste variable analytics module (901) includes an OBD data transceiver unit (903) and a vehicle-side fuel waste variable identification and analytics unit (905). Furthermore, the server-side fuel waste variable analytics module (913) includes a server-side fuel waste variable identification and analytics unit (915) and a vehicle fuel consumption database (917), as shown in FIG. 9. Moreover, the data communication network (911) may include at least one of a cellular communication network, a satellite communication network, a land-mobile radio communication network, or a combination thereof.

In the embodiment of the invention as shown in FIG. 9, the vehicle OBD unit (907) is installed inside a vehicle (909), such as a truck, a van, a taxi, or another vehicle. The vehicle OBD unit (907) is also typically connected to an engine control unit and other vehicular control chipsets to record, diagnose, and generate a variety of engine, vehicle dynamics, and fuel consumption data as a real-time data stream. This real-time data stream from the vehicle OBD unit (907) can be transmitted locally inside the vehicle (909) to the vehicle-side fuel waste variable analytics module (901), which in turn analyzes the real-time data stream to relay, analyze, and/or determine one or more fuel waste variables. Some variables determined and calculated may include, but are not limited to, WSpeed, WRPM, WHA, WHB, and WIdling, which have been defined as mathematical expressions at least for some embodiments of the invention. These fuel waste variables may further be normalized by a vehicle-specific RPG value to generate FWSpeed, FWRPM, FWHA, FWHB, and FWIdling, as also described in the Specification.

In the embodiment of the invention as shown in FIG. 9, various vehicle dynamics and fuel consumption data parameters from the vehicle OBD unit (907) are transmitted to the server-side fuel waste variable analytics module (913), and are categorized and stored in the vehicle fuel consumption database (917) for subsequent calculation of various fuel waste variable metrics and vehicle-specific RPG's. The vehicle fuel consumption database (917) can store, update, and categorize incoming data from the vehicle OBD unit (907) by vehicle models and makes, wherein the vehicle fuel consumption database (917) is typically operated and executed by a computer server located in the remote monitoring station unit (919). Furthermore, the vehicle fuel consumption database (917) may also store, update, and categorize vehicle dynamics and fuel consumption datasets by driving routes and traffic conditions.

Continuing with FIG. 9, in one embodiment of the invention, the vehicle-side fuel waste variable analytics module (901) may request and receive a relevant portion of the vehicle dynamics and fuel consumption datasets from the vehicle fuel consumption database (917) through the data communication network (911), in order to calculate the driving score and various fuel waste variable quantifications in the vehicle-side fuel waste variable identification and analytics unit (905). In another embodiment of the invention, the driving score and various fuel waste variable quantifications may be calculated entirely by the server-side fuel waste variable identification and analytics unit (915) after the real-time data stream from the vehicle OBD unit (907) is wirelessly transmitted to the server-side fuel waste variable analytics module (913) via the OBD data transceiver unit (903) and the data communication network (911).

If the server-side fuel waste variable identification and analytics unit (915) is performing all of the analysis and the calculations associated with the driving score and various fuel waste variable quantifications, it may be unnecessary to implement the vehicle-side fuel waste variable identification and analytics unit (905) in such instances. Yet in another embodiment of the invention, some of the driving score and fuel waste variable calculations are performed inside the vehicle (909) by the vehicle-side fuel waste variable analytics module (901), while some other portions of the driving score and fuel waste variable calculations are performed by the server-side fuel waste variable analytics module (913). In such instances, the separate calculations from the vehicle-side fuel waste variable analytics module (901) and the server-side fuel waste variable analytics module (913) may be combined or shared through the data communication network (911).

Furthermore, as shown in FIG. 9, the remote monitoring station unit (919) is a vehicle fleet monitoring location for one or more vehicles in operation. In the preferred embodiment of the invention, the remote monitoring station unit (919) may be a commercial vehicle operation control center, a vehicle monitoring service center, or an fleet vehicle employer's information technology (IT) control center that also houses a computer server for executing and operating the server-side fuel waste variable analytics module (913), including its components such as the server-side fuel waste variable identification and analytics unit (915) and the vehicle fuel consumption database (917).

For a seamless operation of the fuel waste variable identification and analysis system (900) with the remote real-time OBD monitoring, a monitoring station personnel in the remote monitoring station unit (919) may access, view, and/or control vehicle fuel efficiency-related information that are analyzed, calculated, and generated by the server-side fuel waste variable analytics module (913) and the computer server.

Figure 10:
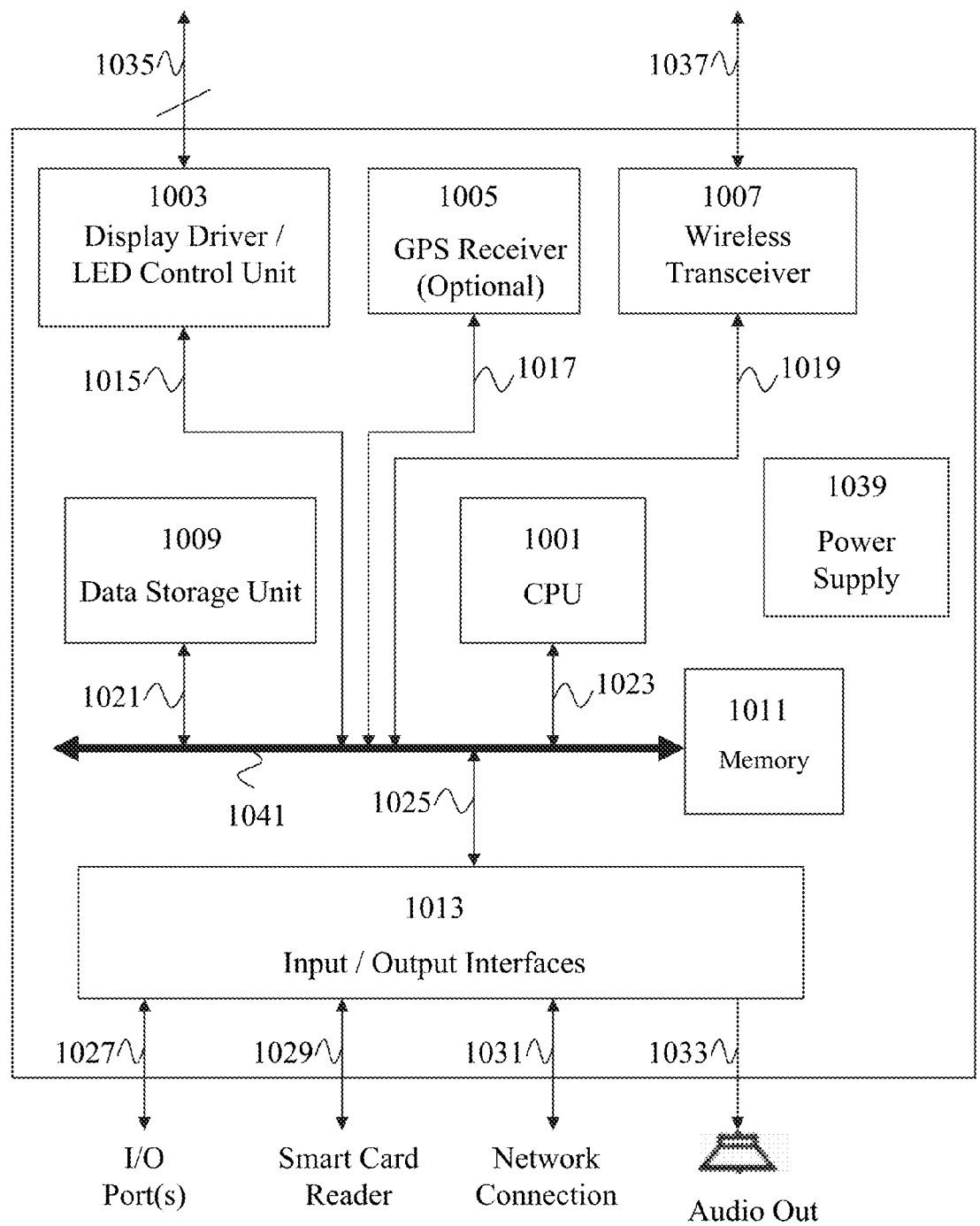
FIG. 10 shows a system block diagram example for a vehicle-side fuel waste variable analytics module, in accordance with an embodiment of the invention.

FIG. 10 shows a system block diagram example (1000) for a vehicle-side fuel waste variable analytics module, in accordance with an embodiment of the invention. In this system block diagram example, the vehicle-side fuel waste variable analytics module includes a CPU (1001), a memory unit (1011), a data storage unit (1009), a display driver and/or LED control unit (1003), a wireless transceiver (1007), an input/output interfaces (1013), and a power supply (1039). Optionally, the vehicle-side fuel waste variable analytics module also has a global positioning system (GPS) receiver (1005).

In one embodiment of the invention, these hardware system blocks (e.g. 1000) for the vehicle-side fuel waste variable analytics module are configured to execute a vehicle-side fuel waste variable identification and analytics unit (e.g. 905 of FIG. 9) in the CPU (1001) and the memory unit (1011). In another embodiment of the invention, the vehicle-side fuel waste variable identification and analytics unit (e.g. 905 of FIG. 9) may be hard-coded into a semiconductor chip as a hardware component within the hardware system blocks of the vehicle-side fuel waste variable analytics module (e.g. 901 of FIG. 9). Furthermore, the wireless transceiver (1007) in the system block diagram example (1000) for the vehicle-side fuel waste variable analytics module (e.g. 901 of FIG. 9) can function as an OBD data transceiver unit (e.g. 903 of FIG. 9), with a wireless data communication interface (1037). The wireless transceiver (1007) may be configured to transmit or receive data packets via a cellular network, a satellite network, a land-mobile radio network, or via another wireless communication method.

Continuing with FIG. 10, the data storage unit (1009) in the vehicle-side fuel waste variable analytics module can store OBD data streams from a vehicle OBD unit and any information retrieved from a vehicle fuel consumption database. Furthermore, the vehicle-side fuel waste variable identification and analytics unit (e.g. 905 of FIG. 9) executed in the hardware system blocks (i.e. the CPU (1001) and the memory unit (1011)) of the vehicle-side fuel waste variable analytics module (e.g. 901 of FIG. 9) can retrieve the OBD data streams and the vehicle fuel consumption information from the data storage unit (1009) to calculate a real-time driving score and various fuel waste variable quantifications for a vehicle driver. In addition, the display driver and/or LED control unit (1003) can provide fuel efficiency, fuel waste variables, and driving score-related graphics information to a display panel or to a plurality of LED indicator lights through a display driver output (1035).

Furthermore, in one embodiment of the invention, the GPS receiver (1005) in the vehicle-side fuel waste variable analytics module may be utilized to record and synchronize GPS location information with the OBD data streams for combining the real-time route and/or traffic condition information of the vehicle with the real-time fuel efficiency and fuel waste variable information associated with the vehicle driver. Moreover, various hardware components (i.e. 1001, 1003, 1005, 1007, 1009, 1011, 1013, 1039) of the vehicle-side fuel waste variable analytics module can transmit and receive data among each other via an internal bus (1041) and various electrical connections (1015, 1017, 1019, 1021, 1023, 1025).

In the embodiment of the invention as shown in FIG. 10, the vehicle-side fuel waste variable analytics module also includes the power supply unit (1039), which supplies electrical power to various hardware components (i.e. 1001, 1003, 1005, 1007, 1009, 1011, 1013, 1039) in the hardware system blocks of the vehicle-side fuel waste variable analytics module. Furthermore, the vehicle-side fuel waste variable analytics module may also include the input/output interfaces (1013) that can accommodate data communication for I/O ports (1027), smart card readers (1029), network connections (1031), and an audio out connection (1033) to a speaker. As shown in the system block diagram example (1000), in this embodiment of the invention, the input/output interfaces (1013) are operatively connected to the internal bus (1041), which can communicate with any other components in the vehicle-side fuel waste variable analytics module.

FIG. 11 shows components of fuel efficiency improvement factors (1101, 1102) in a vehicle, in accordance with an embodiment of the invention. In a preferred embodiment of the invention, the fuel efficiency improvement factors comprise mechanical and physical improvement factors (1101) and non-mechanical improvement factors (1102), as shown in FIG. 11. Some of the mechanical and physical improvement factors (1101) that can improve fuel efficiency in an aftermarket upgrade include, but are not limited to, tire rolling resistance, aerodynamic drag, engine tune-up, and fuel injection system cleaning.

For example, a commercial vehicle that installs lower inertia tires may be able to achieve a higher fuel efficiency by reducing the tire rolling resistance. Furthermore, the commercial vehicle may also improve fuel efficiency by installing aerodynamic body kits on its chassis, which reduces air drag coefficient. The reduction in air drag coefficient with such aerodynamic body kits becomes especially significant if the commercial vehicle is cruising at high speeds for a substantial portion of its operation. Moreover, if the commercial vehicle is an aging vehicle, an engine tune-up can reduce unnecessary internal frictions inside the aging vehicle's engine, thereby also improving fuel efficiency of the commercial vehicle. Similarly, periodically performing the fuel injection system cleaning in the commercial vehicle may also reduce unnecessary internal frictions in the commercial vehicle's powertrain, which in turn also improves fuel efficiency. Furthermore, installing an aftermarket automatic engine shutoff/start device to prevent unnecessary engine idling above a set period of idling time can further improve fuel efficiency of the commercial vehicle.

In the preferred embodiment of the invention, these types of aftermarket mechanical and physical upgrades can realistically be supported by vehicle owners and/or fleet vehicle operators. Therefore, in context of the preferred embodiment of the invention, the vehicle owners and/or the fleet vehicle operators can routinely check commercial vehicle drivers' "driving scores" and various fuel waste variables through periodically computer-generated driving pattern analysis reports, or through on-demand interactions with the fuel waste variable identification and analysis system. Then, if the commercial vehicle owners and/or the fleet vehicle operators want to systematically improve the physical and mechanical aspects of the commercial vehicles for increased fuel efficiency, the commercial vehicle owners and/or the fleet vehicle operators can make capital commitments in purchasing and installing aftermarket parts, such as lower inertia tires, aerodynamic body kits, and automatic engine shutoff/start devices. Likewise, the commercial vehicle owners and/or the fleet vehicle operators can also make capital commitments in fuel efficiency-related aftermarket vehicle services, such as engine tune-ups and fuel injection system cleaning, to increase the overall vehicle fuel efficiency. In general, the commercial vehicle owners and/or the fleet vehicle operators can directly control the mechanical and physical improvement factors (1101), but the non-mechanical improvement factors (1102) are largely dependent upon each driver's driving behavior, particular routes, and traffic conditions.

As also shown in FIG. 11, the non-mechanical improvement factors (1102) comprise traffic and environmental conditions and driver habits. Examples of traffic and environmental conditions include, but are not limited to, road congestion levels (e.g. stop-and-go rush hour traffic, emergency road blockage, free-flowing traffic, and etc.), varying road elevations (i.e. winding mountain roads, near sea-level straight roads, and etc.), outside air temperature during a vehicle's operation, and frequencies of left turns and right turns to get to the destination. In some instances, the driver may have some discretionary control over the traffic and environmental conditions. For example, the driver can choose a less congested route, avoid rush hours if possible, and also avoid winding and mountainous road if there is a compelling alternate route in order to maximize fuel efficiency. The level of driver control for fuel efficiency is even more significant in case of the driver habits. The driver has a direct control of speed, engine RPM levels, acceleration, braking, and idling, all of which contribute to inefficient or efficient fuel usage for the commercial vehicle.

As shown in the non-mechanical improvement factors (1102) in FIG. 11, specific fuel waste variables include, but are not limited to, fuel wasted due to over-speeding (i.e. "FWSPEED"), fuel wasted due to over-RPM (i.e.

"FWRPM"), fuel wasted due to hard acceleration (i.e. "FWHA"), fuel wasted due to hard braking (i.e. "FWHB"), and fuel wasted due to engine idling (i.e. "FWIdling"). Therefore, in one embodiment of the invention, by checking a real-time "driving score" and various fuel waste variables in the commercial vehicle displayed through a display panel connected to the vehicle-side fuel waste variable analytics module, the driver can be motivated to make necessary adjustments and optimizations related to the non-mechanical improvement factors (1102) for increasing the fuel efficiency of the commercial vehicle.

In a commercial vehicle fleet organization, each driver of a commercial vehicle may even be politically and/or financially motivated by a corporate policy that issues promotions or bonuses, based on a daily, weekly, monthly, quarterly, or yearly-averaged number of each driver's driving score. For example, if there is $5,000 total fuel savings in the commercial vehicle fleet organization in August compared to the previous month (i.e. July), or the same month of the previous year (i.e. August of last year), a corporate policy may reward one or more drivers with high driving scores by issuing monthly bonuses that are set to be 30% of the overall fuel savings per month. In this case, the fuel savings objective can be reset annually or periodically to continue to improve the overall fuel efficiency driving performance over time in the commercial vehicle fleet organization. Furthermore, the commercial vehicle fleet organization can accurately and objectively track its employees' (e.g. drivers') driving scores and fuel waste variables over time, and make appropriate staffing decisions based on each employee's performance.

FIG. 12 shows an equation (1200) for calculating "RPG," or engine rotation per minute per gallon of fuel, which is a fuel waste variable-normalizing metric. For various embodiments of the invention, quantifying wasted fuel due to a plurality of fuel waste variables involves normalization of the fuel waste variables with a novel metric called "RPG." RPG is a measurement of a vehicle engine's rotation per minute (RPM) in a course of a trip (i.e. thus, multiplied by the elapsed time) divided by the amount of fuel used for the trip. RPG measures a vehicle engine's characteristic and typical RPM per gallon of fuel in one or more trips, and this metric is generally consistent (i.e. as shown in FIGS. 2 and 3) in all trips for a particular vehicle. Therefore, utilizing RPG as a normalizing factor for fuel waste variable measurements enables a realistic representation of a driver's fuel wasting behaviors in context of the particular vehicle's inherent, native, and average fuel consumption characteristics. In a preferred embodiment of the invention, an RPG value for a specific vehicle is utilized as a normalization and comparison factor for determination of fuel waste in various fuel waste variables. RPG-normalized fuel waste variables include, but are not limited to, FWSPEED, FWRPM, FWHA, FWHB, and FWIdling.

Figure 13:
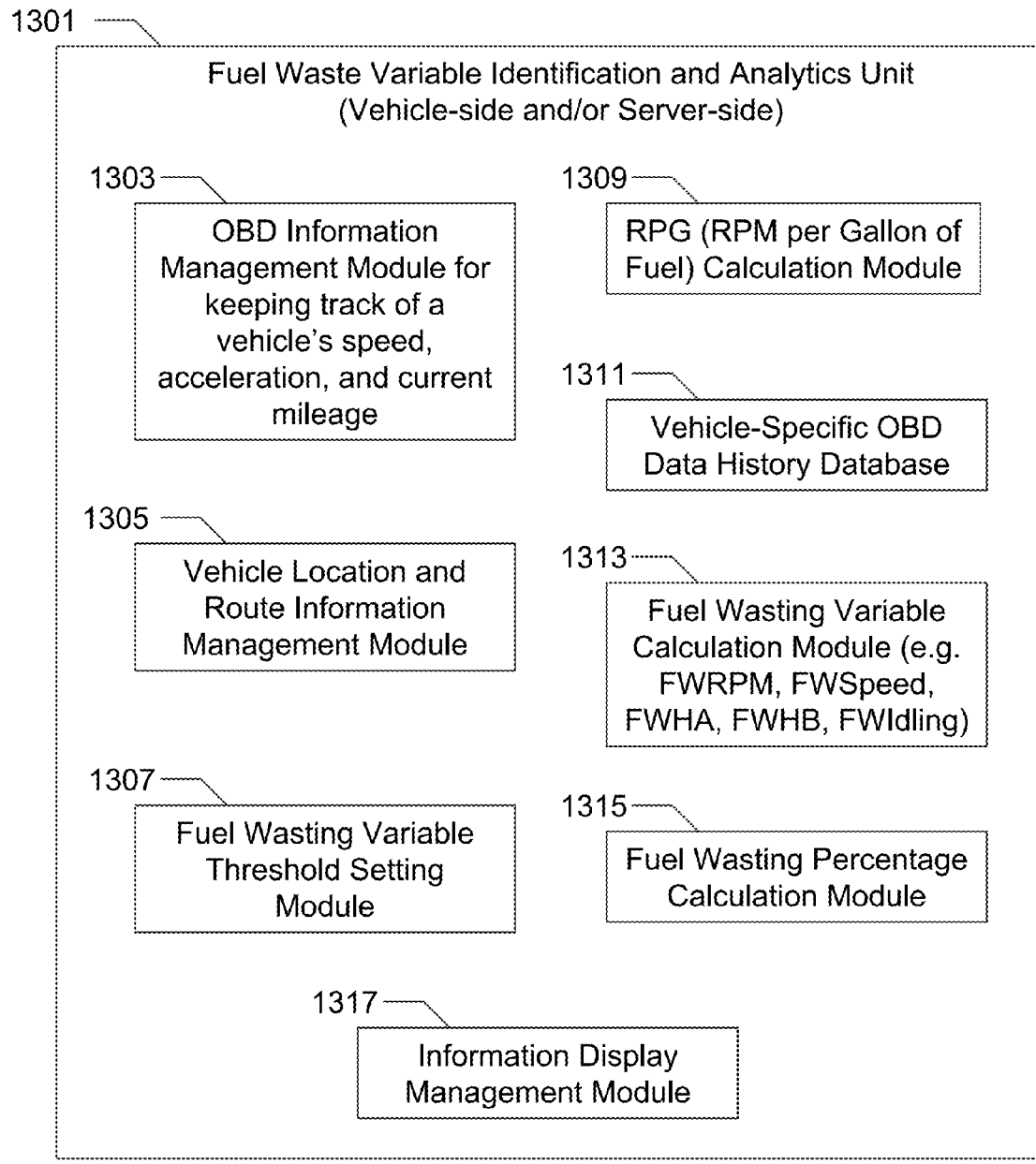
FIG. 13 shows an example of internal modules in a fuel waste variable identification and analytics unit, in accordance with an embodiment of the invention.

FIG. 13 shows an example of internal modules (1300) in a fuel waste variable identification and analytics unit (1301), in accordance with an embodiment of the invention. In this embodiment, an OBD information management module (1303) receives an OBD data stream from a vehicle OBD unit (e.g. 907 of FIG. 9), and keeps track of various data parameters such as vehicle speed, RPM, acceleration, and fuel consumption data. The OBD information management module (1303) then transmits or shares those various data parameters with other modules. For example, an RPG calculation module (1309) can derive a vehicle-specific RPG value, based on a summation of instantaneous RPM values multiplied by a selected period of time interval, divided by the total fuel consumption for the selected period of time interval, as illustrated by the equation (1200) in FIG. 12.

Furthermore, a vehicle-specific OBD data history database (1311) can accumulate and categorize the various data parameters outputted from the OBD information management module (1303). This database can be executed on a CPU and a memory unit of a computer server as part of the server-side fuel waste variable analytics module (e.g. 913 in FIG. 9), or it can be executed on a different electronic system within the fuel waste variable identification and analysis system. Moreover, a fuel wasting variable calculation module (1313) can compute various fuel waste variable quantifications, such as pre-RPG-normalized fuel waste variables (e.g. WSpeed, WRPM, WHA, WHB, WIdling) and RPG-normalized fuel waste variables (e.g. FWSpeed, FWRPM, FWHA, FWHB, FWIdling).

Moreover, the internal modules (1300) in the fuel waste variable identification and analytics unit (1301) may also include a fuel wasting variable threshold setting module (1307). This module can enable a system operator to set threshold values for various fuel waste variables. For example, for excessive speeding, the threshold can be set at 100 km/h, and for excessive over-revving, the threshold can be set at 2,500 RPM. Furthermore, for excessive hard acceleration and hard braking, the thresholds can be set at 0.18 g and −0.18 g, respectively. In addition, for engine idling, the threshold may be set at five minutes, in one example. The threshold values configured in the fuel wasting variable threshold setting module (1307) are then subsequently utilized in computations of various fuel waste variable quantifications, such as pre-RPG-normalized fuel waste variables (e.g. WSpeed, WRPM, WHA, WHB, WIdling) and RPG-normalized fuel waste variables (e.g. FWSpeed, FWRPM, FWHA, FWHB, FWIdling).

Continuing with FIG. 13, the internal modules (1300) in the fuel waste variable identification and analytics unit (1301) may also include a fuel wasting percentage calculation module (1315), which computes a particular vehicle's wasted fuel percentage relative to a total amount of fuel consumption by the particular vehicle in a selected period of time interval. The user interface screenshot (100) in FIG. 1 illustrates an example of quantifying the wasted fuel percentages (e.g. 26.5 percent of fuel purchased) in a driving pattern analysis report to the vehicle operator and the driver.

In addition, the internal modules (1300) in the fuel waste variable identification and analytics unit (1301) may also include a vehicle location and route information management module (1305) to analyze and track unfavorable traffic routes that are correlated with high incidences of wasted fuel alerts. For example, traffic routs that are correlated with spikes in magnitude of fuel waste variables can be recorded and subsequently reported to the vehicle operator and the driver in the driving pattern analysis report. Furthermore, the fuel waste variable identification and analytics unit (1301) may also include or be connected to an information display management module (1317), which is configured to display the driving pattern analysis report to the vehicle operator and the driver, as exemplified by the user interface screenshot (100) of FIG. 1.

In one embodiment of the invention, various modules in the fuel waste variable identification and analytics unit (1301), as shown in FIG. 13, may be implemented as software modules executed in a CPU or a memory unit of a computer server. In another embodiment of the invention, various modules in the fuel waste variable identification and analytics unit (1301), as shown in FIG. 13, may be implemented in one or more semiconductor chips. Yet in another embodiment of the invention, various modules in the fuel waste variable identification and analytics unit (1301), as shown in FIG. 13, may be implemented as a combination of software modules and one or more semiconductor chips.

Figure 14:
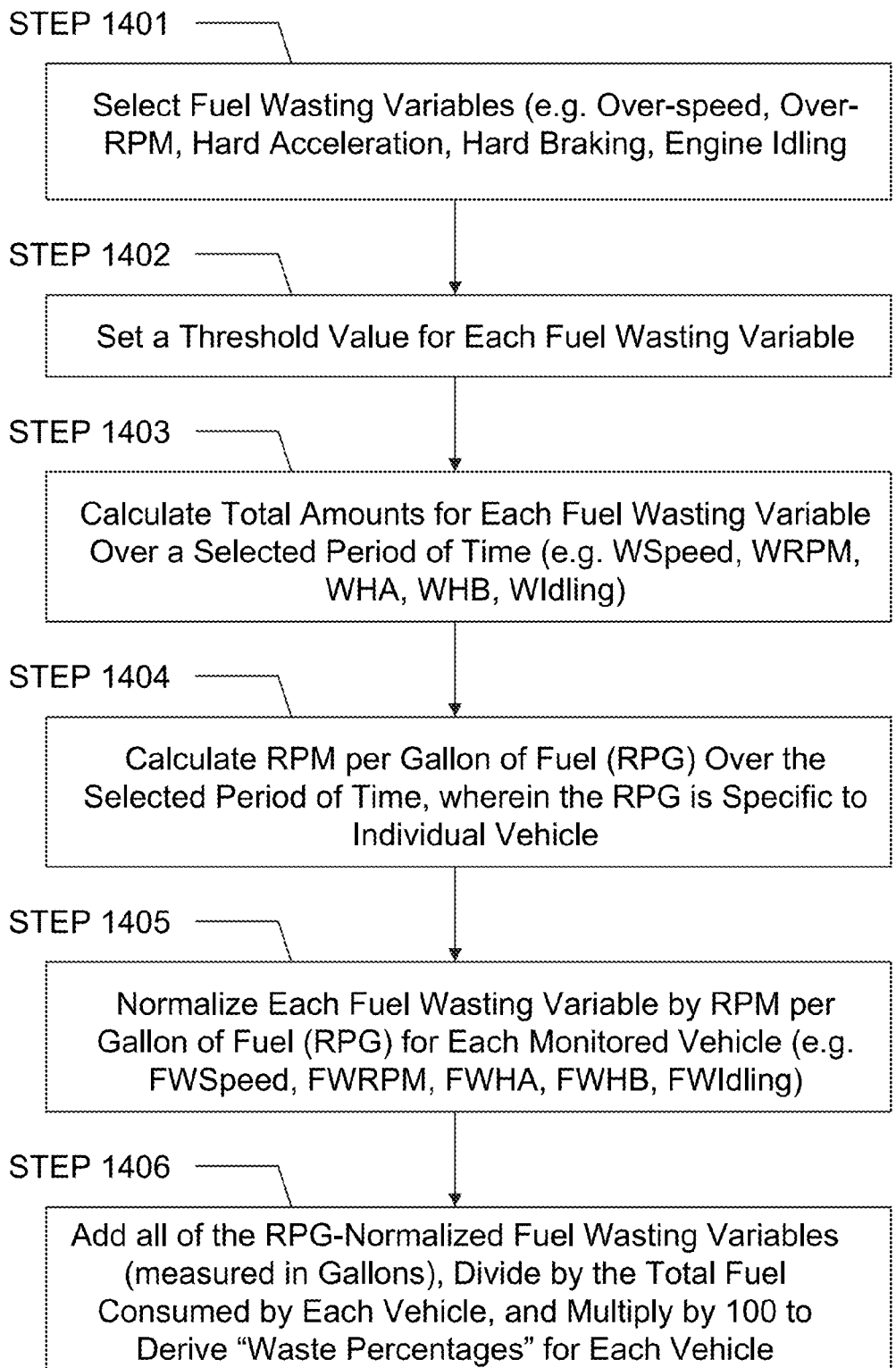
FIG. 14 shows a method flowchart for deriving RPG-normalized fuel wasting variables and waste percentages, in accordance with an embodiment of the invention.

FIG. 14 shows a method flowchart (1400) for deriving RPG-normalized fuel wasting variables and waste percentages, in accordance with an embodiment of the invention. As shown in STEP 1401, a human operator or a machine-learning entity with artificial intelligence for the fuel waste variable identification and analysis system selects fuel wasting variables. Examples of fuel wasting variables include, but are not limited to, over-speeding, over-revving, hard acceleration, hard braking, and engine idling. Then, the human operator or the machine-learning entity with artificial intelligence can also configure a threshold value for each fuel wasting variable, as shown in STEP 1402. For example, for excessive speeding, the threshold value can be set at 100 km/h, and for excessive over-revving, the threshold value can be set at 2,500 RPM. Furthermore, for excessive hard acceleration and hard braking, the threshold values can be set at 0.18 g and −0.18 g, respectively. In addition, for engine idling, the threshold value may be set at five minutes, in one example.

Then, the fuel waste variable identification and analysis system calculates total amounts for each fuel waste variable over a selected period of time, prior to RPG normalization, as shown in STEP 1403. These calculations, in one example, may involve computing values for WSpeed, WRPM, WHA, WHB, and WIdling, based on vehicle dynamics and fuel consumption data transmitted from OBD data streams and the threshold values set for each fuel waste variable. The fuel waste variable identification and analysis system also calculates a vehicle-specific RPG value over the selected period of time, as shown in STEP 1404.

Subsequently, the fuel waste variable identification and analysis system normalizes each computed fuel waste variable (e.g. WSpeed, WRPM, WHA, WHB, and WIdling) by RPG for each monitored vehicle, thus deriving RPG-normalized fuel waste variables, such as FWSpeed, FWRPM, FWHA, FWHB, and FWIdling, as shown in STEP 1405. Then, the RPG-normalized fuel waste variables can be added, and divided by the total fuel consumed by each vehicle, and then multiplied by 100 to derive fuel waste percentages for each monitored vehicle, as shown in STEP 1406.

Various embodiments of the present invention provide several key advantages to conventional attempts of fuel savings and wasted fuel quantifications. One advantage of an embodiment of the present invention is providing a novel electronic system that enables a vehicle operator to track, manage, and improve fuel efficiency of its fleet vehicles in operation with a centralized electronic infrastructure, which gives the vehicle operator and vehicle drivers a detailed and real-time understanding of potential fuel waste variables and fuel efficiency improvement factors.

Another advantage of an embodiment of the present invention is providing a novel electronic system that identifies, calculates, and analyzes a driver's driving behavior to pinpoint problematic fuel waste variables that are particular to a driver and to a particular vehicle, in an effort to improve the fuel efficiency of the particular vehicle by optimizing driving events, habits, and behaviors. Moreover, an additional advantage of an embodiment of the present invention is providing a driving pattern analysis display interface generated from a novel electronic system to motivate both vehicle operating entities and vehicle drivers to understand, predict, and improve vehicle fuel efficiencies through mechanical improvement factors as well as non-mechanical improvement factors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A fuel waste variable identification and analysis system with a remote real-time vehicle on-board diagnostics monitoring, the fuel waste variable identification and analysis system comprising:
   a vehicle on-board diagnostics unit connected to an engine control unit or a vehicular control chipset of a vehicle to record, diagnose, and generate engine, vehicle dynamics, and fuel consumption data as a real-time data stream;
   a fuel waste variable analytics module that receives the real-time data stream from the vehicle on-board diagnostics unit for detailed analysis and calculations of one or more fuel waste variables;
   a fuel waste variable identification and analytics unit in the fuel waste variable analytics module, wherein the fuel waste variable identification and analytics unit sets threshold values for the fuel waste variables, retrieves historical fuel consumption data from a vehicle-specific OBD data history database, and calculates pre-RPG (engine rotation per minute per gallon of fuel) normalized fuel waste variables, a vehicle-specific RPG value, RPG-normalized fuel waste variables, and a fuel waste percentage value for a selected period of time interval;
   the vehicle-specific OBD data history database that accumulates, stores, and categorizes vehicle dynamics and fuel consumption data downloaded from the vehicle; and
   a computer server or another electronic device with a CPU and a memory unit that displays the RPG-normalized fuel waste variables on a display panel in the vehicle or in a remote monitoring station unit.

2. The fuel waste variable identification and analysis system of claim 1, further comprising an on-board diagnostics data transceiver unit in the vehicle and a data communication network to transmit the real-time data stream from the vehicle on-board diagnostics unit to the computer server or to the remote monitoring station unit wirelessly.

3. The fuel waste variable identification and analysis system of claim 2, wherein the on-board diagnostics data transceiver unit in the vehicle is capable of requesting and receiving the vehicle-specific OBD data history from the vehicle-specific OBD data history database.

4. The fuel waste variable identification and analysis system of claim 1, wherein the fuel waste variable identification and analytics unit in the fuel waste variable analytics module further comprises an OBD information management module, an RPG calculation module, a fuel waste variable calculation module, a fuel waste percentage calculation module, a vehicle location and route information management module, a fuel waste variable threshold setting module, and an information display management module.

5. The fuel waste variable identification and analysis system of claim 1, wherein the fuel waste variable analytics module is a vehicle-side module, a computer server-side module, or both.

6. The fuel waste variable identification and analysis system of claim 1, further comprising a vehicle location and route information management module that correlates spikes in magnitudes of the RPG-normalized fuel waste variables with routes and road conditions to identify unfavorable routes and conditions for fuel efficient driving.

7. The fuel waste variable identification and analysis system of claim 1, wherein the one or more fuel waste variables include over-speeding, over-revving, hard acceleration, hard braking, and engine idling.

8. The fuel waste variable identification and analysis system of claim 1, wherein the vehicle-specific RPG value is a summation of engine rotation-per-minute (RPM) values multiplied by the selected period of time interval divided by a total fuel consumption during the selected period of time interval.

9. The fuel waste variable identification and analysis system of claim 1, wherein the RPG-normalized fuel waste variables are derived by dividing the pre-RPG normalized fuel wasted variables by the vehicle-specific RPG value.

10. The fuel waste variable identification and analysis system of claim 1, further comprising an information display management module for generating graphical data to display a driving pattern analysis report on the display panel in the vehicle or in the remote monitoring station unit.

11. The fuel waste variable identification and analysis system of claim 1, wherein the vehicle is a truck, a taxi, a van, or another vehicle operated and managed by a vehicle fleet company.

12. The fuel waste variable identification and analysis system of claim 1, wherein the RPG-normalized fuel waste variables assist a driver of the vehicle to identify a specific factor for fuel waste from a fuel waste category that encompasses over-speeding, over-revving, hard acceleration, hard braking, or prolonged engine idling of the vehicle.

13. The fuel waste variable identification and analysis system of claim 1, wherein the RPG-normalized fuel waste variables assist a vehicle operations manager to pinpoint a specific factor for fuel waste from a fuel waste category that encompasses over-speeding, over-revving, hard acceleration, hard braking, or prolonged engine idling of the vehicle.

14. The fuel waste variable identification and analysis system of claim 1, wherein the fuel waste variable identification and analytics unit also calculates and keeps track of fuel waste variable trends over a day, a week, a month, a year, or another set period of time.

\* \* \* \* \*